United States Patent
Cardente

(10) Patent No.: US 6,327,766 B1
(45) Date of Patent: Dec. 11, 2001

(54) METHOD FOR REPAIRING STUDS FIXED TO A COVER FOR A TRANSMISSION TORQUE CONNECTOR

(75) Inventor: Joseph A. Cardente, Johnston, RI (US)

(73) Assignee: Portland Transmission Company, Inc., Providence, RI (US)

(*) Notice: Subject to any disclaimer, the term of this patent is extended or adjusted under 35 U.S.C. 154(b) by 0 days.

(21) Appl. No.: 09/291,380

(22) Filed: Apr. 14, 1999

(51) Int. Cl.⁷ .................................................. B23P 6/00
(52) U.S. Cl. ........................... 29/402.16; 29/402.01; 29/402.09; 219/98; 219/99; 228/119
(58) Field of Search ................. 29/402.16, 402.01, 29/402.03, 402.04, 402.06, 402.07, 402.08, 402.09; 219/99, 98; 228/119

(56) References Cited

U.S. PATENT DOCUMENTS 2,631,360 * 3/1953 Sanford et al. .
4,562,329 * 12/1985 Minton ................................... 219/98

FOREIGN PATENT DOCUMENTS

363108977 * 5/1988 (JP) .

* cited by examiner

Primary Examiner—I Cuda Rosenbaum
Assistant Examiner—John C. Hong
(74) Attorney, Agent, or Firm—St. Onge Steward Johnston & Reens LLC

(57) ABSTRACT

A cover for a transmission torque connector having loosened or otherwise damaged bolts is repaired for reuse. One method includes removing a loosened bolt, and plugging and countersinking the bolt hole. The countersunk area on the exterior of the cover provides an area to form a welding bead to permanently seal the whole. The surface is then prepared for welding a stud onto it to complete the repair. In the case where the original bolt is damaged but has not been loosened, the top part of the bolt can be cut off so that the bolt can serve as the plug.

11 Claims, 2 Drawing Sheets

METHOD FOR REPAIRING STUDS FIXED TO A COVER FOR A TRANSMISSION TORQUE CONNECTOR

TECHNICAL FIELD

The invention relates to repairing a cover for a transmission torque connector having loosened, worn or bent bolts that cause a weakened structure and, in some cases, damage to critical drive components of the vehicle they are components of.

Transmission torque connectors of the type used in automatic transmissions for automobiles, trucks and buses will typically have a number of bolts extending through holes. These bolts, typically six, through connection to the crankshaft, carry the full power of the engine. Typically, bolts of this type are welded in place to provide a fluid-tight seal but can come loose due to a number of causes such as torsion and vibration from rough-running diesel engines or loose flywheels. When the bolts loosen, lubricating fluid within the cover can leak and cause damage to surfaces under it and failure of internal parts due to loss of lubrication. Simply welding the bolts from the back or welding with solder have not been effective answers to the problem. Similarly, stripped or bent bolts cannot be effectively repaired.

There is a current need for a method for easily, effectively repairing a cover for a transmission torque connector having loosened bolts. Further, there is a need to provide a torque connector cover wherein the bolts are securely fastened and do not leak.

DISCLOSURE OF INVENTION

It is an object of the invention to permit reuse of a cover for a transmission torque connector having loosened bolts.

It is another object of the invention to permit reuse of a cover for a transmission torque connector having stripped or bent bolts.

It is an object of the invention to provide a method for effectively repairing a cover for a transmission torque connector having loosened, stripped or bent bolts.

These and other objects are achieved by the present invention which provides an improved method for effectively repairing of a cover for a transmission torque connector having loosened or otherwise damaged bolts, which permits reuse of the cover, and a cover of this type so repaired.

In one aspect, the method comprises: providing a cover having an interior surface, an outer surface and a plurality of holes through which bolts extend; removing a bolt from a hole; fitting a metal plug into the hole in the cover from the inner surface; forming a recess by cutting away a top portion of the plug and an adjoining portion of the outer surface of the cover; filling the recess by forming a welding bead; machining the welding bead to form a welding surface suitable for welding a stud to it; and welding a stud to the welding surface.

In another aspect, the method comprises: providing a cover having an interior surface, an outer surface and a plurality of holes through which bolts extend;, cutting off the top part of a damaged bolt to form a bolt plug; forming a recess by cutting away a top portion of the bolt plug and an adjoining portion of the outer surface of the cover; filling the recess by forming a welding bead; machining the welding bead to form a welding surface suitable for welding a stud to it; and welding a stud to the welding surface.

In another of its aspects, the invention provides a repaired transmission torque connector for use in an automatic transmission for an automobile or bus, comprising: a cover body with an exterior surface and an interior surface; a machined peripheral area on the exterior surface; a plurality of holes with bolts extending through the cover body in the machined area; and, a stud welded to the exterior surface of the cover body in the machined area.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
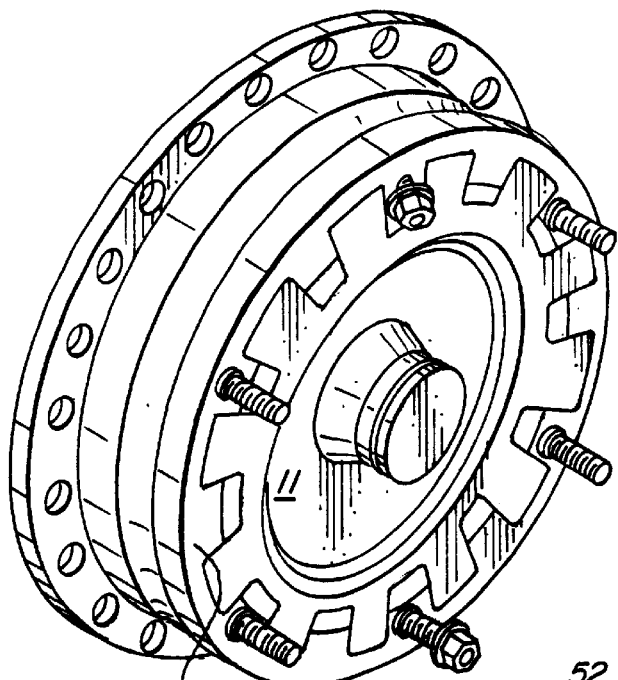
FIG. 1 is a perspective view of a cover for a transmission torque connector.
Figure 2:
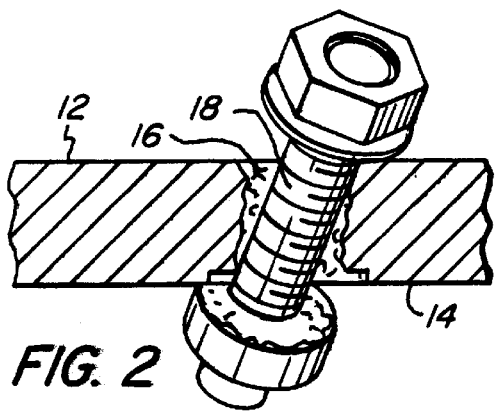
FIG. 2 is a cross sectional taken through a bolt hole showing a side view of a bolt that has come loose and is in need of repair.

Reference will first be made to FIG. 1, which is a perspective view of a cover 10 for a transmission torque connector of the type used in automatic transmissions for automobiles and buses. The cover 10 has body 11 with an exterior surface 12 and an interior surface 14 (see FIG. 2) and a plurality of holes 16 (again, see FIG. 2) with bolts 18 extending therethrough in machined peripheral area 19 on the exterior surface. Typically, bolts of this type are spin welded in place to provide a fluid-tight seal but can come loose due to a number of causes such as torsion and vibration. FIG. 2 shows a severely damaged bolt and hole.

Figure 3:
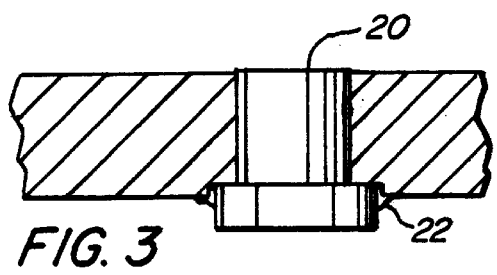
FIG. 3 is a cross sectional view of the hole in FIG. 2, but with the bolt removed and a plug force-fitted therein.

To effect the repair, a metal plug 20 is inserted into the hole, as can be seen in FIG. 3. The plug 20 is preferably specially sized to fit in the hole 16 by force fitting from the inner surface and can then be spin welded in place as can be evidenced by bead 22 formed around the periphery.

If practical, as in the case where the original weld between the bolt and the interior surface of the cover has not been damaged, the old bolt can be cut off flush with the exterior surface of the cover and serve as the plug 20. In this case the plug is referred to as a bolt plug. This type of repair is useful where the bolt is stripped, bent or otherwise damaged, without effecting the seal formed by the original weld.

Figure 4:
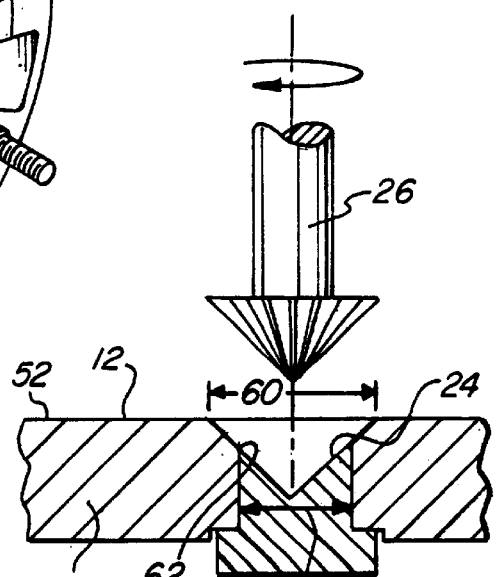
FIG. 4 is a cross sectional view of the hole in FIG. 3, with the plug being countersunk.
Figure 5:
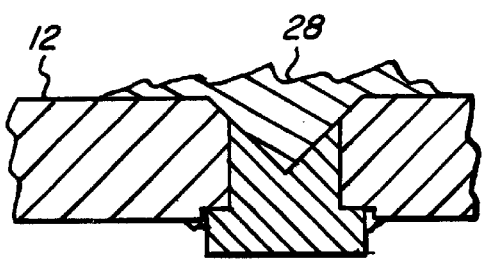
FIG. 5 is a cross sectional view of the hole in FIG. 4, with the countersunk area of the plug filled by weld metal.

In the next step of the process a recess 24 is formed in the plug 20 by cutting away a top portion of the plug and an adjoining portion of the outer surface of the cover. This is shown in FIG. 4, which shows a countersink bit 26 having just completed cutting out the recess 24. FIG. 5 shows the recess filled by a welding bead 28 that is formed therein. Preferably, the bead 28 is formed by the use of a soft welding rod, but other materials can be effective. This step fully and permanently seals the hole.

Figure 6:
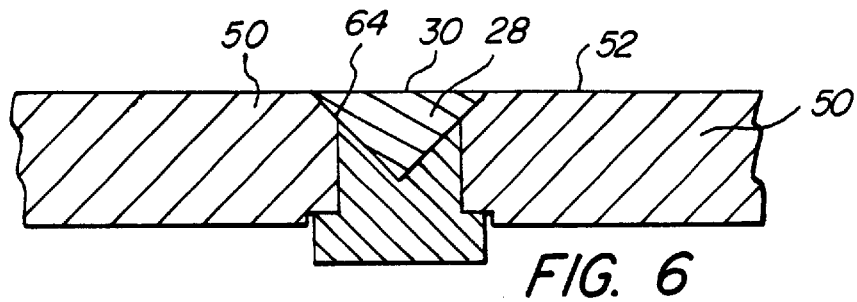
FIG. 6 is a cross sectional view of the hole in FIG. 5, with the weld metal machined flush with the surface of the cover.

The bead formed is typically irregular and the welding step may have warped the cover. To correct for this, the welding bead and the surrounding outer surface is machined to form a welding surface suitable for welding a stud to it. The machined surface 30 is represented in FIG. 6. Also, the machining of the peripheral area 19 can provide a true surface and correct for warping due to welding.

Figure 7:
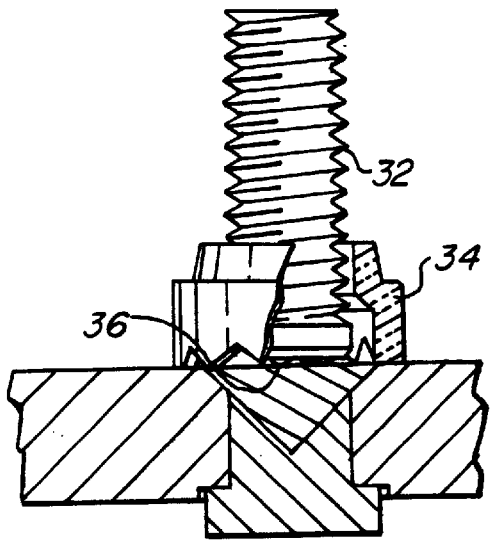
FIG. 7 is a cross sectional view of the hole in FIG. 6, with a specially-designed stud positioned over the weld.

FIG. 7 illustrates the next step of the process, wherein a threaded stud 32 is positioned over the welding surface 30 for securing, preferably by stud welding. Preferably, a ceramic shield 34 is positioned around the stud during the welding operation to restrict flow of molten metal while allowing for the escape of gases. The objective of the welding is to achieve a bolt extension over the location of the original hole to functionally replace the original bolt and make the cover acceptable for reuse. In welding a stud to a welding surface in this manner, the stud is first placed with an end against the welding surface. Note that the stud has a flux ball or cone 36 at the end in contact with the welding surface.

The stud 32 is retracted from the welding surface as a low current pilot arc is formed between the stud and the welding surface. A main, high-current, weld arc is then superimposed between the stud and the welding surface. This arc causes portions of the stud and the welding surface to be molten and the stud is then plunged forward to engage the welding surface. The molten portions join and solidify to securely weld the stud to the welding surface when they return to full contact. U.S. Pat. No. 4,214,144 and U.S. Pat. No. 5,414,234 are incorporated herein by reference for their teachings of welding methods and equipment.

Figure 8:
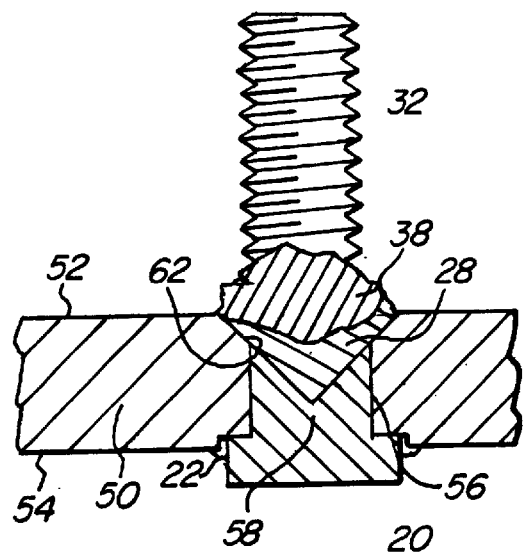
FIG. 8 is a cross sectional view of the hole in FIG. 7, with the stud welded to the cover.
Figure 9:
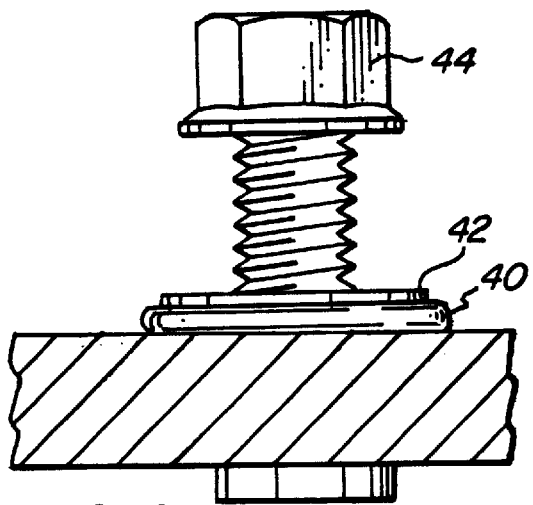
FIG. 9 is a cross sectional view of cover, with the repair completed.

Some of the molten metal tends to flow outwardly as the stud strikes the welding surface to establish a fillet between the stud and the welding surface. As shown in FIG. 8, this fillet 38 under normal conditions is substantially uniformly formed with the aid of the ceramic shield 34 located around the end of the stud. The process is complete, and a suitable washer 40, spacer 42 and/or nut 44 can be applied as seen in FIG. 9.

As shown in FIGS. 1 and 8, the repaired transmission torque converter has six threaded studs welded to the exterior surface of the cover body. At least two, and preferably all six of the bolts will be replaced when a repaired transmission torque connector is provided. As shown best by FIG. 8, the connector has a cover body 50 with an exterior surface 52 and an interior surface 54. As shown in the drawings, the surfaces 52 and 54 are parallel, but since the cover body is usually a casted item, the cover body can have a variety of shapes and thicknesses. At least two and preferably all six of the threaded bolts were replaced by welded studs. The description with respect to the stud 32 shown in FIG. 8 is applicable to two or more of the bolts that are replaced.

The hole 56 extends through the cover body, and each hole has a diameter 58. Each hole is filled with a plug 20. The plug 20 is placed in the hole from beneath and fastened in place by a weld bead 22 around the periphery. The weld bead 22 is only one feasible way of permanently securing the plug 20 in hole 56, and other suitable methods of attachment may be used.

As shown particularly well in FIG. 4 (as well as FIG. 8), a recess 24 extends inwardly into the cover body from the exterior surface 52. The recess 24 has a diameter 60 that is larger than the diameter 58 and creates a joint 62 between the plug 20 and the cover body 50. The joint is located entirely below the exterior surface 52 of the cover body 50. As will be seen in FIG. 8, the location of this joint is below the exterior surface of the cover body to ensure that the joint does not leak after the weld bead is placed in recess 24. Referring once again to FIG. 8, a weld bead 28 fills the recess and seals the joint 62 against liquid leakage. The stud 32 is preferably attached to the weld bead 28 by welding 38.

In accordance with one aspect of the invention, recess 24 conical in shape, and the base of the conical shape has a diameter 60 which is greater than the diameter 58 of the plug 20. This provides a joint 60 that is located beneath the surface 52 of the cover body 50 and which is located at the juncture of the plug, the conical recess and the cover body. This provides a circular joint 62 which is sealed against liquid leakage.

In accordance with a preferred aspect of the invention, as shown in a comparison between FIGS. 5 and 6, the weld bead 28 is preferably machined from the stage shown in FIG. 5 to the stage shown in FIG. 6 such that the exterior surface 30 of the weld bead 28 is coplanar with the exterior surface 52 of the body 50. This provides a smooth surface for the application of threaded study 32.

The above construction of the threaded stud and the way it is attached to the cover body provides several unique advantages. Because the joint 62 is located beneath the exterior surface 52 of the cover body 50, the likelihood of leakage is almost nonexistent because of the large surface area of the weld between the weld bead 28 and the cover body 50. More specifically, referring to FIG. 6, a welded seal between weld bead 28 and cover body 50 is provided along a frustoconical surface 64 which provides a liquid tight seal and also a very firm base to ultimately secure the threaded stud. This construction ensures an arrangement that does not leak and also provides a solid base for the stud 32. Further, by machining the weld bead 28 to provide a flat surface 30, there is a clean new surface that easily receives threaded stud 32 and provides a fresh integral joint between stud 32 and surface 30, and said joint is provided by weld 38. When all six of the original bolts are replaced by such studs, the cover is strong and leak proof.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

What is claimed is:

1. A method for repairing a cover for transmission torque connector, comprising:

providing a cover having an interior surface, an outer surface and a plurality of holes through which bolts extend;

removing a bolt from at least one of a hole;

fitting a metal plug into at least one of the hole in the cover from the inner surface;

forming a recess by cutting a top portion of the plug and an adjoining portion of the outer surface of the cover to provide an area to form a welding bead to permanently seal the hole;

filling the recess by forming a welding bead;

machining the welding bead to form a welding surface suitable for welding a stud to it; and welding a stud to the welding surface.

2. A method according to claim 1, wherein the stud is welded to the welding surface by stud welding.

3. A method according to claim 1, wherein forming the welding bead with soft welding rod metal.

4. A method according to claim 1, wherein positioning a ceramic shield around a base of the stud during the step of welding it to the welding surface.

5. A method according to claim 1, wherein maching a peripheral area on the exterior surface to provide a true surface and correct for warping due to welding.

6. A method according to claim 5, wherein positioning a ceramic shield around the base of the stud during the step of welding it to the welding surface and the stud is welded to the welding surface by stud welding.

7. A method according to claim 6, wherein forming the welding bead with soft welding rod metal.

8. A method for repairing a cover for transmission torque connector for use in an automatic transmission for an automobile, truck or bus, the cover including a cover body with an exterior surface and an interior surface and at least two holes extending through the cover body, and each hole having a diameter, said method comprising the steps of:

filled each hole with a plug permanently secured in each hole;

creating a joint between the plug and cover body with a recess extending inwardly into the cover body from the exterior surface, the recess having a diameter larger than the hole diameter, the joint being located entirely below the exterior surface of the cover body;

filling the recess and sealing the joint against liquid leakage with a weld bead, and attaching a threaded stud permanently to the weld bead.

9. A method according to claim 8, wherein said creating a joint step comprises the step of creating a generally circular joint which extends around the diameter of the plug at a location below the exterior surface of the cover body.

10. A method according to claim 9, wherein said creating a joint step comprises the step of creating a generally conical joint wherein the conical joint has a base having a diameter larger than the hole diameter and having an interior point located approximately on the axis of the hole, the joint located at the intersection of the plug, the cover body and the conical wall of the recess, to provide a circular joint that it located in the interior of the cover body.

11. A method according to claim 20, further comprising the step of machining the weld bead to create an exterior surface that is coplanar with the exterior surface of the cover body to provide a smooth uniform surface, and wherein said attaching step comprises the step of welding a threaded stud to the exterior surface of the weld bead.

\* \* \* \* \*